United States Patent [19]

Andrews

[11] Patent Number: 5,359,405
[45] Date of Patent: Oct. 25, 1994

[54] HYBRID FIBER OPTIC SENSOR INCLUDING A LEAD OUT OPTICAL FIBER HAVING A REMOTE REFLECTIVE END

[75] Inventor: Jeffrey P. Andrews, Abingdon, Md.

[73] Assignee: Martin Marietta Corporation, Bethesda, Md.

[21] Appl. No.: 972,393

[22] Filed: Nov. 6, 1992

[51] Int. Cl.$^5$ .............................................. G01B 9/02
[52] U.S. Cl. .................................. 356/35.5; 356/345; 250/227.27
[58] Field of Search ........................ 356/345, 73.1, 352, 356/35.5, 32, 72; 250/227.27, 227.19

[56] References Cited

U.S. PATENT DOCUMENTS 5,202,939 4/1993 Belleville et al. ............. 250/227.27
5,301,001 4/1994 Murphy et al. ..................... 356/345

OTHER PUBLICATIONS

A. Tomita, "Interferometric technique for measuring small gaps in single and multimode fiber connectors".

Primary Examiner—Samuel A. Turner
Assistant Examiner—Peter J. Rashid
Attorney, Agent, or Firm—Gay Chin; Bruce M. Winchell; David B. Bonham

[57] ABSTRACT

A device and method are described for measuring changes association with a gap between a lead-in optical fiber and a lead-out optical fiber. A hybrid fiber optic sensor is created by inserting the lead-in and lead-out optical fibers into a small tube such that a gap is provided between the fibers. Laser pulses incident on the gap create two interfacial reflections that interfere with one another, thus providing a method of measuring changes in gap length in the same was as a typical Fabry-Perot type interferometer. Moreover, a reflection from the far end of the lead-out fiber gives gap information in the same way as typical intensity-based sensor. Together the two measurements overcome the limitations that occur when each technique is used separately, and are made possible by means of the above hybrid fiber optic sensor which contains both a Fabry-Perot interferometer portion and an intensity-based sensor portion.

12 Claims, 2 Drawing Sheets

HYBRID FIBER OPTIC SENSOR INCLUDING A LEAD OUT OPTICAL FIBER HAVING A REMOTE REFLECTIVE END

BACKGROUND OF THE INVENTION

This invention relates to fiber optic sensors for characterizing a gas-filled gap between a lead-in optical fiber and a lead-out optical fibers. More particularly, this invention relates to a hybrid fiber optic sensor that characterizes the gas-filled gap length by combining the features of a Fabry-Perot interferometer and an intensity-based sensor.

One method of measuring changes in the length of an air gap between a lead-in optical fiber and a lead-out optical fiber is to determine the number of interference fringes arising from the two air-glass interfaces associated with the air gap. Existing interferometric methods, while able to accurately detect changes in air gap length, suffer from an inability to determine whether the air gap length is increasing or decreasing in direction.

Another method for measuring the length of the air gap is by measuring of the intensity of a reflected signal associated with a third interface at the remote end of the lead-out fiber. The amplitude of the reflected signal decreases with an increase in air gap length. Such intensity-based methods, however, are subject to errors arising from intensity changes due to loss mechanisms affecting the lead fibers.

SUMMARY OF THE INVENTION

The hybrid fiber optic sensor of the present invention overcomes the directional ambiguity inherent in interferometers and the lead fiber sensitivity inherent in intensity-based sensors by combining the features of a Fabry-Perot interferometer and an intensity-based sensor.

More specifically, the hybrid fiber optic sensor comprises a lead-in optical fiber and a lead-out optical fiber that are aligned within an alignment sleeve such that a gap is provided between the two lead fibers. Moreover, the lead-out optical fiber is provided in a predetermined minimum length and is preferably provided with a reflective coating on an end of the fiber remote from the gap. The hybrid sensor is preferably operated using an Optical Time Domain Reflectometer ("OTDR"). The hybrid fiber optic sensor detects changes in gap length by counting the number of interference fringes resulting from double Fresnel reflections associated with the two interfaces at the gap, and it detects the direction of the change in gap length by measuring changes in the amplitude of a reflection associated with the end of the lead-out fiber remote from the gap.

The above is a brief description of some of the deficiencies in prior art sensors and the advantages of the present invention. Other features, advantages, and embodiments of the invention will be apparent to those skilled in the art for the following description, accompanying drawings and appended claims.

DETAILED DESCRIPTION OF THE INVENTION

Figure 1:
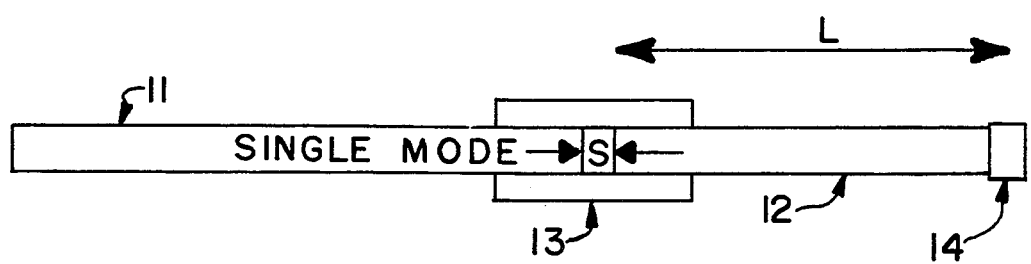
FIG. 1 illustrates a hybrid fiber optic sensor according to an embodiment of the present invention.

As shown in FIG. 1, the hybrid fiber optic sensor of the present invention comprises lead-in 11 and lead-out 12 sections of optical fiber (preferably single mode) and an alignment sleeve consisting of a hollow tubing section 13 whose inner diameter is very slightly larger than the outer diameter of the lead-in 11 and lead-out 12 optical fibers. The hollow tubing section 13 can comprise, for example, a silica capillary tube that is drawn from a preform using the same techniques as those used in optical fiber manufacturing. The lead-in 11 and lead-out 12 optical fibers are inserted into the hollow tubing section 13 such that an air gap S is formed. The air gap S is preferably on the order of $\sim 100$ $\mu$m in length. The lead-in 11 and lead-out 12 optical fibers may be tacked into place within the hollow tubing section 13 by means of a fusion "weld" (e.g., for embedded applications) or may be left unbounded (e.g., for external "attached" applications).

Figure 2:
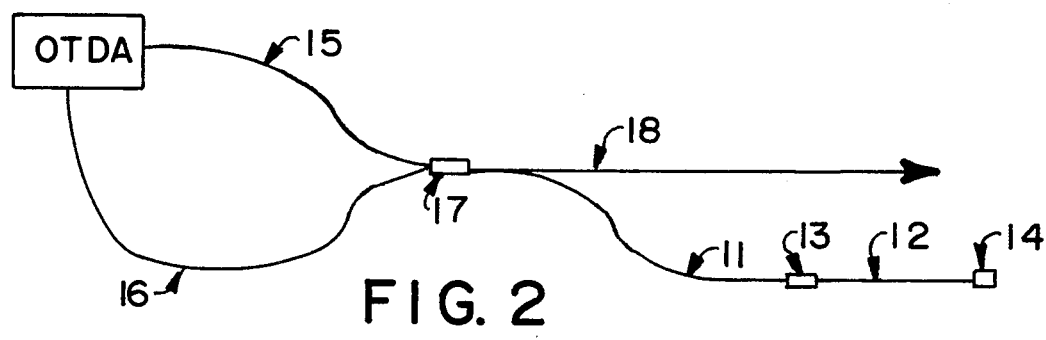
FIG. 2 illustrates a hybrid fiber optic sensor system that includes an OTDR and the sensor of FIG. 1.

As shown in FIG. 2, the optical source for the hybrid fiber optic sensor system of the present invention is preferably an Optical Time Domain Reflectometer ("OTDR"). The OTDR contains a laser (not shown) that launches short pulses of light into the lead-in 11 optical fiber. Upon reaching the air gap S, two Fresnel reflections are created—one from the glass-air interface of the lead-in 11 optical fiber and one from the air-glass interface of the lead-out 12 optical fiber. These two reflections will be in or out of phase in an amount dependent upon the length of the air gap S. Because of the relatively long coherence length of some OTDR systems ($\sim 1.3$ mm in air) these two reflections will interfere with one another and go through constructive and destructive interference fringes as the air gap S changes by multiples of $\frac{1}{4}$ wavelength. In this manner, the Fabry-Perot interferometer component of the hybrid fiber optic sensor of the present invention can measure changes in gap length. As pointed out above, however, a limitation associated with the Fabry-Perot technique is that the sensor response for increasing gap length is the same as that for decreasing gap length. This "directional ambiguity" is a problem association with most Fabry-Perot interferometers.

To overcome this problem, a hybridization of two sensor concepts is used according to an embodiment of the present invention. Referring back to FIG. 1, a third reflection is created at the far end of the lead-out 12 optical fiber. The magnitude of this reflection is preferably increased with the application of a reflective coating 14 to the end of the lead-out 12 optical fiber end. The far end reflection is resolvable in time from the double Fresnel reflection associated with the air gap S, provided the lead-out 12 optical fiber is of sufficient length L. For commercial OTDR systems presently available, this length L is greater than about 4 cm. The amplitude of the far end reflection is related to the air gap length S. On its first pass through the air gap S, the original pulse from the OTDR system is attenuated by Fresnel reflections as well as losses associated with the air gap S. After reflection from the far end of the lead-out 12 fiber, the pulse is again attenuated by Fresnel reflections and losses proportional to the gap length S. Therefore, when a host material, for example, is put into tensile strain, the air gap S increases in length causing an increase in attenuation and, thus, a decrease in the amplitude of the far end reflection. Hence, a direct correlation between reflected intensity and strain can be determined. For the purposes of the hybrid fiber optic sensor of the present invention, however, it is the direction of the change in amplitude of the end reflection that is of interest. An increasing end reflection amplitude in the intensity-based sensor component of the hybrid fiber optic sensor of the present invention indicates decreasing strain, and vice versa. This information resolves the directional ambiguity associated with typical interferometers.

Just as interferometers suffer from directional ambiguity, intensity-based sensors also have similar limitations. Typical intensity-based sensors are subject to misleading changes in signal amplitude arising from intensity changes due to loss mechanisms affecting the lead fibers. In the configuration of the present invention, however, if an intensity change in the intensity-based sensor component is not accompanied by a corresponding number of fringes from the Fabry-Perot interferometer component, the intensity change can be ignored.

Thus, the Fabry-Perot interferometer component of the sensor resolves the fundamental problem of typical intensity-based sensors, just as the intensity-based sensor component resolves the fundamental problem of typical Fabry-Perot interferometers.

Moreover, two other significant problems are associated with traditional all-fiber interferometers. First, such interferometers are highly susceptible to thermal drift. Thermal drift is erroneous signal data arising from thermally induced phase shifts that are caused by the thermo-optic effect. Second, polarization changes in the two interfering waves can cause the fringes to disappear. This second effect occurs when the two interfering waves have their polarizations rotated such that the two waves are orthogonal and is caused by changes in birefringence in the fibers. The degree of birefringence can be altered by physical perturbations and temperature changes and, therefore, is a significant problem for most all-fiber interferometers.

The hybrid fiber optic sensor of the present invention overcomes these problems, because the region in which the two interfering waves are separated is the air gap itself. Any perturbations to the signal will therefore have to occur in the air gap. The thermo-optic coefficients of gases, such as air, are orders of magnitude below that of silica. Therefore the thermo-optic effect is reduced by orders of magnitude, nearly eliminating thermal drift. Second, gases are not birefringent, eliminating the problem of polarization fading that occurs in all-fiber interferometers. This occurs in such interferometers when the sensing or reference fiber is physically perturbed.

Two experiments were performed to demonstrate the viability of the present invention. One embodiment of the hybrid fiber optic sensor system of the present invention is shown in FIG. 2. In FIG. 2, an OTDR is equipped with a transmitting optical fiber 15 and a receiving optical fiber 16. A coupler 17 connects the optical path of the transmitting optical fiber 15 and the receiving optical fiber 16 with the lead-in 11 optical fiber and an auxiliary optical fiber 18, which leads to one or more additional sensors. Such a system is easily time multiplexed to reduce the cost per sensor.

Figure 3:
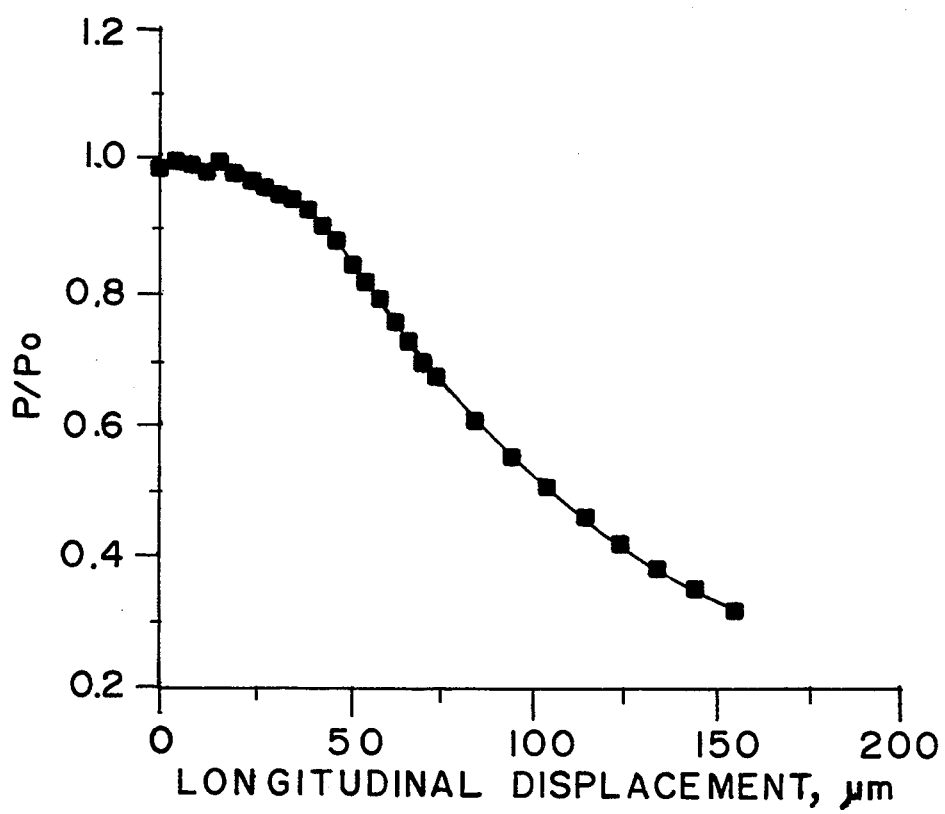
FIG. 3 is a graph of normalized power as a function of longitudinal displacement as measured by the system in FIG. 2.

The first experiment was conducted to verify the intensity-based sensor portion of the hybrid fiber optic strain sensor system of FIG. 2. Longitudinal displacement, resulting in air gap S, was accurately controlled by mounting the lead-in 11 and lead-out 12 optical fibers on two alignment stages (not shown). Then, the lead-out 12 optical fiber was moved away from the lead-in 11 optical fiber by means of piezo-electric controls (not shown) and intensity data recorded. Recall that it is the reflected intensity from the far end of the lead-out 12 optical fiber that is recorded and not the intensity from the double Fresnel reflection associated with the air gap S. The data for longitudinal displacement vs. normalized power (intensity) is shown in FIG. 3.

Figure 4:
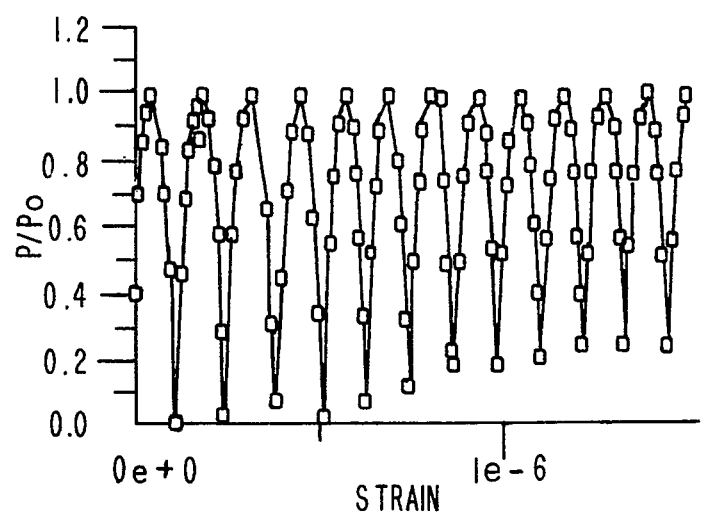
FIG. 4 is a graph of normalized power as a function of strain as measured by the system in FIG. 2.
Figure 5:
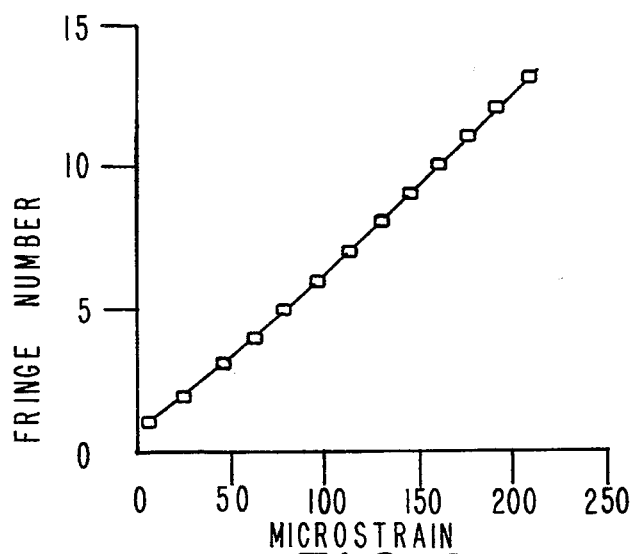
FIG. 5 is a graph of fringe number as a function of microstrain for the data of FIG. 4.

The second experiment verified the Fabry-Perot interferometer portion of the hybrid fiber optic strain sensor system of FIG. 2. Here, the sensor was mounted to a cantilever beam (not shown) whose tip was incrementally displaced by a micropositioner (not shown). This time, however, the intensity information recorded was that associated with light reflecting off of the air-glass interfaces at the air gap S. It was expected that the normalized power (intensity) would oscillate through fringes as the cantilever beam deflection caused the air gap S to expand through multiples of $\pi$, in this case, 625 nm. As shown in FIG. 4, the fringes are very clearly defined. The data of FIG. 4 are also displayed as microstrain vs. fringe number in FIG. 5.

Of course, some error naturally exists in the above data. However, the fact that manual data acquisition was possible is a tribute to the stability of the sensor. Typically, interferometers will drift through many fringes in one minute, whereas the design of FIG. 2 appears to have drifted only one fringe in the 21 minutes it took to record this data. The stability of the interferometer is attributed to the fact that the region in which the two interfering waves are separated is the air gap. As expected, thermal drift and polarization fading are not a problem with this design.

Figure 6:
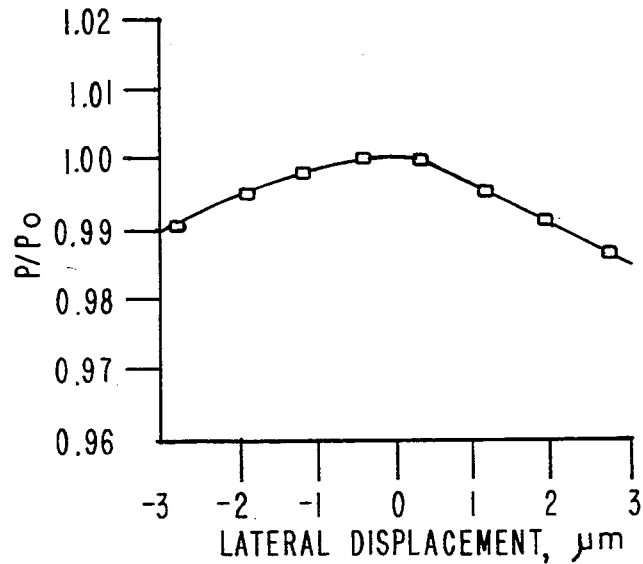
FIG. 6 is a graph of normalized power as a function of lateral displacement as measured by the system in FIG. 2.

The issue of radial displacement is of some concern with the hybrid fiber optical sensor or FIG. 2. Therefore, an experiment was also performed wherein normalized power through the sensor was measured as a function of displacement in the radial direction. This data is shown in FIG. 6. Because the capillary tubing allowed for a total of only 3 microns of radial movement, power fluctuation was $\leq 1\%$.

The above discussion is based upon the detection of changes in air gap length that can then be used, for example, to determine strain. The hybrid fiber optic sensor of the present invention can be used to measure strain in practically any structure. For example, the sensor of the present invention is particularly suited to be embedded in composite materials for the purpose of measuring strain in advanced undersea and aero structures. Of course, the sensor of the present invention could also be used to measure other environmental parameters based on gap length as well as environmental parameters based upon gas composition or density.

Thus, a hybrid optical fiber strain sensor design has been described which is far more practical than many sensor concepts to date. All prior fiber sensor concepts have inherent difficulties that limit or preclude their use in applications beyond the laboratory. The above hybrid design simultaneously uses two sensor components and is, therefore, able to overcome the limitations of each sensor component when operated individually. The design subsequently offers the sensitivity of a Fabry-Perot interferometer with the reliability of an intensity-based sensor.

The above is a detailed description of a particular embodiment of the invention. The full scope of the invention is set out in the claims that follow and their equivalents. Accordingly, the claims and specification should not be construed to unduly narrow the full scope of the protection to which the invention is entitled.

I claim:

1. An apparatus for sensing an environmental parameter comprising:
    a lead-in optical fiber with a first end for injecting an input optical signal and a semi-reflective end opposite said first end for creating a first partial reflection of said input optical signal; and
    a predetermined length of lead-out optical fiber with a first at least partially reflective end for creating a far-end reflection of said input optical signal and a second semi-reflective end for creating a second partial reflection of said input optical signal; said lead-in and lead-out optical fibers being axially aligned with a gap provided between the semi-reflective end of the lead-in optical fiber and the second semi-reflective end of the lead-out optical fiber such that the first partial reflection, the second partial reflection, and the far-end reflection of the input optical signal form an output signal at said first end of the lead-in optical fiber.

2. The apparatus of claim 1, wherein said input signal, said gap and said predetermined length are selected such that the first and second partial reflections interfere with one another, while the far-end reflection is resolvable in time from the first and second partial reflections in said output signal.

3. The apparatus of claim 2, wherein said input signal is generated by an optical source that is optically linked to the first end of the lead-in optical fiber and said output signal is received by an optical processor that is optically linked to the first end of the lead-in optical fiber, said optical processor having a first sensor portion for counting interference fringes associated said first and second partial reflections and a second sensor portion for detecting a change in intensity in the far-end reflection.

4. The apparatus of claim 3 wherein the optical processor comprises an optical time domain reflectometer.

5. The apparatus of claim 1 wherein the first at least partially reflective end of the lead-out fiber is provided with a reflective coating.

6. The apparatus of claim 2 wherein the semi-reflective end of the lead-in optical fiber and the second semi-reflective end of the lead out fiber are movably disposed within an alignment sleeve.

7. The apparatus of claim 2 wherein the semi-reflective end of the lead-in optical fiber and the second semi-reflective end of the lead-out fiber are affixed within an alignment sleeve using fusion welds.

8. The apparatus of claim 1 wherein the gap is on the order of 100 microns.

9. The apparatus of claim 1 wherein the predetermined length is on the order of 4 cm.

10. The apparatus of claim 1 wherein the first at least partially reflective end is fully reflective.

11. The apparatus of claim 1 wherein the first at least partially reflective end is partially reflective to allow light to pass through, thereby enabling the apparatus to be multiplexed.

12. A method of measuring an environmental parameter comprising:
    providing an apparatus comprising an optical source for injecting an input optical signal; a lead-in optical fiber with a first end for injecting the input optical signal and a semi-reflective end opposite said first end for creating a first partial reflection of said input optical signal; and a predetermined length of lead-out optical fiber with a first at least partially reflective end for creating a far-end reflection of said input optical signal and a second semi-reflective end for creating a second partial reflection of said input optical signal; said lead-in and lead-out optical fibers being axially aligned with a gap provided between the semi-reflective end of the lead-in optical fiber and the second semi-reflective end of the lead-out optical fiber such that the first partial reflection, the second partial reflection and the far-end reflection of the input optical signal form an output signal at said first end of the lead-in optical fiber; and said input signal, said gap and said predetermined length being selected such that the first and second partial reflections interfere with one another while the far-end reflection is resolvable in time from the first and second partial reflections in said output signal;
    counting interference fringes associated with the first and second partial reflections arising from the change in the environmental parameter; and
    measuring an intensity of the far-end reflection to resolve directional ambiguity associated with the interference fringes.

* * * * *

UNITED STATES PATENT AND TRADEMARK OFFICE
CERTIFICATE OF CORRECTION

PATENT NO. : 5,359,405
DATED : October 25, 1994
INVENTOR(S) : Jeffrey P. Andrews It is certified that error appears in the above-indentified patent and that said Letters Patent is hereby corrected as shown below:

Title Page, Item 56, References Cited, add the following:

U.S. PATENT DOCUMENTS

| | | |
|---|---|---|
| 4,873,989 | 10/1989 | Einzig |
| 4,881,813 | 11/1989 | Koo et al |
| 5,094,534 | 3/1992 | Cole et al |
| 4,974,961 | 12/1990 | Jackson et al |
| 4,948,254 | 8/1990 | Ishida |
| 4,924,477 | 5/1990 | Gilmore et al |

OTHER PUBLICATIONS

J.P. Andrews, "Hybrid Fiber Optic Strain Sensor Resolves Directional Ambiguity of Time Multiplexed Fabry-Perot," Smart Materials and Structures Series, Active Materials and Adaptive Structure, Proceedings of the ADPA/AIAA/ASME/SPIE Conference on Active Materials and Adaptive Structures, 4-8 November 1991, Alexandria, Virginia, Gareth J. Knowles, Editor, pp. 661-665.

Awad Samir Gerges, T.P. Newson, D.A. Jackson, "Coherence Tuned Fiber Optic Sensing System, with Self-initialization, Based on a Multimode Laser Diode," Applied Optics, 20 October 1990, Vol. 29, No. 30, pp. 4473-4480.

Kent A. Murphy, Michael F. Gunther, Ashish M. Vengasarkar, and Richard O. Claus, "Quadrature Phase-Shifted Extrinsic Fabry-Perot Optical Fiber Sensors", Optic Letters, February 5, 1991, Vol. 16, No. 4, pp. 273-275.

UNITED STATES PATENT AND TRADEMARK OFFICE
CERTIFICATE OF CORRECTION

PATENT NO. : 5,359,405  Page 2 of 2
DATED : October 25, 1994
INVENTOR(S) : Jeffrey P. Andrews It is certified that error appears in the above-indentified patent and that said Letters Patent is hereby corrected as shown below:

Brian R. Fogg, Anbo Wang, Mark S. Miller, Kent A. Murphy, and Richard O. Claus, "Optical Fiber Sensor for Absolute Measurement", <u>Fiber Optic Sensor-Based Smart Materials and Structures Workshop</u>, Blacksburg, VA, April 15-16, 1992.

Signed and Sealed this

Twenty-sixth Day of September, 1995

Attest:

BRUCE LEHMAN

Attesting Officer   Commissioner of Patents and Trademarks